US012779253B2

(12) United States Patent
Choi et al.

(10) Patent No.: US 12,779,253 B2
(45) Date of Patent: Nov. 3, 2026

(54) MASK APPARATUS

(71) Applicant: LG Electronics Inc., Seoul (KR)

(72) Inventors: Chiyoung Choi, Seoul (KR); Hojung Kim, Seoul (KR); Sangkyun Baek, Seoul (KR); Yeongcheol Mun, Seoul (KR); Yongmin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1114 days.

(21) Appl. No.: 17/868,143

(22) Filed: Jul. 19, 2022

(65) Prior Publication Data

US 2023/0017783 A1 Jan. 19, 2023

(30) Foreign Application Priority Data

Jul. 19, 2021 (KR) ........................ 10-2021-0093998

(51) Int. Cl.
*A62B 18/08* (2006.01)
*A62B 18/00* (2006.01)
(Continued)

(52) U.S. Cl.
CPC ............ *A62B 18/08* (2013.01); *A62B 18/025* (2013.01); *A62B 23/02* (2013.01); *A62B 18/006* (2013.01)

(58) Field of Classification Search
CPC ....... A62B 18/08; A62B 18/02; A62B 18/025; A62B 23/02; A62B 18/006; A62B 18/084;
(Continued)

(56) References Cited

U.S. PATENT DOCUMENTS 2,939,458 A * 6/1960 Lundquist ............ A62B 18/025 128/206.25
4,907,584 A * 3/1990 McGinnis ............. A61M 16/06 128/206.28
(Continued)

FOREIGN PATENT DOCUMENTS

CN 105615048 A 6/2016
CN 107961456 A * 4/2018 ............... A62B 9/06
(Continued)

OTHER PUBLICATIONS

English translation for CN 212817681, machine translated by espacenet.com.*
(Continued)

*Primary Examiner* — Tu A Vo
(74) *Attorney, Agent, or Firm* — Fish & Richardson P.C.

(57) ABSTRACT

A mask apparatus includes a mask body that defines a suction hole and a discharge hole, a face guard coupled to a rear surface of the mask body and configured to contact a face of a user, and an air cleaning module filter external air and to supply the filtered air into a breathing space in the face guard. The face guard includes a coupling portion that faces the rear surface of the rear body, a close contact portion configured to be in contact with the face of the user, a connection portion that connects the coupling portion to the close contact portion and defines one or more widths of the face guard in a front-rear direction, and a spacing protrusion that protrudes from an outer surface of the connection portion to thereby separate at least a portion of the connection portion from the suction hole.

19 Claims, 14 Drawing Sheets

(51) Int. Cl.
*A62B 18/02* (2006.01)
*A62B 23/02* (2006.01)

(58) Field of Classification Search
CPC .......... A61M 16/0622; A61M 16/0616; A41D 13/11–1192; A41F 1/002; A61F 9/068
See application file for complete search history.

(56) References Cited

U.S. PATENT DOCUMENTS 5,349,949 A * 9/1994 Schegerin .............. A62B 18/08 128/201.24
5,441,046 A * 8/1995 Starr ................. A61M 16/0683 128/207.11
5,540,223 A * 7/1996 Starr .................... A62B 18/025 128/205.25
5,570,689 A * 11/1996 Starr ................. A61M 16/0633 128/207.11
5,884,624 A * 3/1999 Barnett ................ A62B 18/025 128/206.25
6,467,483 B1 * 10/2002 Kopacko ............... A61M 16/06 128/912
8,807,135 B2 * 8/2014 Worboys ........... A61M 16/0605 128/206.28
9,510,626 B2 * 12/2016 Blomberg ................ A62B 9/04
9,814,913 B2 * 11/2017 Blomberg ............ A62B 18/006
2002/0144684 A1 * 10/2002 Moone .................. A61M 16/06 128/206.26
2003/0196656 A1 * 10/2003 Moore ............. A61M 16/0622 128/201.22
2003/0196658 A1 * 10/2003 Ging ................. A61M 16/0666 128/201.22
2008/0230068 A1 * 9/2008 Rudolph ........... A61M 16/0683 128/206.28
2008/0257354 A1 * 10/2008 Davidson .............. A61M 16/06 128/206.24
2014/0216475 A1 * 8/2014 Blomberg .............. A62B 18/08 128/863
2015/0034098 A1 * 2/2015 Schumacher ...... A41D 13/1138 128/863
2015/0040911 A1 2/2015 Davidson et al.
2015/0136142 A1 * 5/2015 Blomberg ................ A62B 7/10 128/206.17
2015/0250972 A1 * 9/2015 Haibach ............ A61M 16/0622 128/202.27
2015/0335846 A1 * 11/2015 Romagnoli ........... A61M 16/06 128/201.13
2017/0333660 A1 * 11/2017 Haibach ............ A61M 16/0683
2018/0078798 A1 3/2018 Fabian et al.
2018/0140796 A1 * 5/2018 Haibach ................. A61M 11/00
2019/0175863 A1 * 6/2019 Hocking ........... A61M 16/0616
2020/0121005 A1 4/2020 Belousov et al.
2020/0197645 A1 * 6/2020 Baiko .................... A61M 16/06
2020/0197649 A1 * 6/2020 Haibach ............ A61M 16/0616
2020/0206545 A1 * 7/2020 Kim ...................... A62B 18/025
2020/0206546 A1 * 7/2020 Kim ...................... A62B 23/025

FOREIGN PATENT DOCUMENTS

CN 109069885 A 12/2018
CN 111375150 A 7/2020
CN 212817681 U * 3/2021
EP 3398657 4/2021
KR 101997813 10/2019
KR 20190111386 A * 10/2019 ............. A62B 9/003
KR 20210004492 1/2021
WO WO 2019050082 3/2019

OTHER PUBLICATIONS

Office Action in Chinese Appln. No. 202210802589.1, mailed on Jan. 27, 2025, 13 pages.
Extended European Search Report in European Application No. 22185468.0, dated Dec. 7, 2022, 9 pages.
Notice of Allowance in Chinese Appln. No. 202210802589.1, mailed on Jun. 30, 2025, 7 pages (with English translation).
Office Action in Korean Appln. No. 10-2021-0093998, dated Jul. 19, 2022, 17 pages (with English translation).

* cited by examiner

MASK APPARATUS

CROSS-REFERENCE TO RELATED APPLICATIONS

The present application claims priority under 35 U.S.C. 119 and 35 U.S.C. 365 to Korean Patent Application No. 10-2021-0093998, filed on Jul. 19, 2021, which is hereby incorporated by reference in its entirety.

TECHNICAL FIELD

The present disclosure relates to a mask apparatus.

BACKGROUND

A mask may be defined as a hygiene product that covers the user's nose and mouth to filter harmful substances including germs and dust contained in the air when the user inhales and minimize spreads of virus or bad breath discharged when the user exhales to nearby people.

In some cases, where the virus is highly spreadable and highly contagious, it is recommended that individuals wear a mask to go out for safety in order to minimize transmission.

Various types and forms of masks are released in the market, and in particular, in order to minimize the harmful substances contained in the air from directly entering the mask wearer's respiratory tract, masks may include a filter module. In some cases, in order to facilitate a flow of air passing through the mask when the user inhales or exhales, a mask may include a fan. For example, the mask may include a filter so that the harmful substances contained in external air are filtered and then introduced into the user's respiratory tract.

In some cases, the mask may include a pressure sensing unit that senses a pressure in the breathing space defined between the mask and a user's face, and a fan module of which a rotation speed is variable according to the pressure sensed by the pressure sensing unit, and thus, it helps the user to breathe comfortably even while wearing the mask.

The masks may have a structure in which an air suction hole is defined in a front side of the mask, and an air discharge hole is defined in a rear surface of the mask, in particular, a rear surface of the mask, which corresponds to a point that is close to the user's mouth or nose. Here, the front surface of the mask may refer to a portion exposed to the outside, and the rear surface of the mask may refer to a portion that is in close contact with the user's face.

For example, the air suction hole of the mask may be defined in the front surface that is close to a center of the mask or in the front surface that is close to both side ends of the mask, and the air suction hole may be defined in the front surface that is close to both the side ends of the mask.

In some cases, where the air suction hole is defined in the front surface of the mask, and the air discharge hole is defined in the rear surface of the mask, a flow conversion of air may occur excessively while external air is introduced into the mask to pass through the fan and filter and then is discharged to the user's respiratory tract through the air discharge hole.

In some cases, where the number of flow conversions of the suctioned air increases, flow resistance may increase, and as a result, a load of the fan may increase. In addition, as the load of the fan increases, power consumption of a battery supplying power to the fan may increase. In some cases, as the number of flow conversions of the suctioned air increases, flow noise may increase.

In some cases, when a user of the mask with the air suction hole defined in the front surface of the mask often takes off the mask to leave the mask in a state in which the air suction hole is faced upward or forward, dust may be introduced through the air suction hole.

In some cases, the air suction hole defined in the front surface of the mask may affect an outer appearance of the mask. In some cases, a suction hole cover may be mounted to prevent the air suction hole from being exposed to the outside. In some cases, the suction hole cover may be separated from the mask or damaged due to external force or impacts.

In some cases, the suction hole may be defined at a portion other than the mask body. For example, the suction hole may be defined in a separate air cleaning module that is detachably or foldably coupled to a side surface of the mask body. In this case, flow resistance may increase while the air suctioned into the air cleaning module reaches the discharge hole defined in the center of the mask body.

SUMMARY

According to one aspect of the subject matter described in this application, a mask apparatus includes a mask body that defines a suction hole configured to receive external air from an outside of the mask apparatus and a discharge hole configured to discharge air to the outside, where the mask body includes a rear body and a front body that is coupled to a front surface of the rear body. The mask apparatus further includes a face guard that is coupled to a rear surface of the rear body, that is configured to be in contact with a face of a user, and that defines a breathing space, and an air cleaning module disposed at the rear body and configured to filter the external air received through the suction hole and to supply the filtered air into the breathing space. The face guard includes a coupling portion that faces the rear surface of the rear body, a close contact portion configured to be in contact with the face of the user, a connection portion that connects the coupling portion to the close contact portion and defines one or more widths of the face guard in a front-rear direction, and a spacing protrusion that protrudes from an outer surface of the connection portion to thereby separate at least a portion of the connection portion from the suction hole.

Implementations according to this aspect can include one or more of the following features. For example, the spacing protrusion can have a convex shape or a rounded shape. In some examples, the spacing protrusion can extend along the outer surface of the connection portion in the front-rear direction. In some examples, a length of the spacing protrusion in the front-rear direction can be equal to one of the one or more widths of the connection portion.

In some implementations, the spacing protrusion can be one of a plurality of spacing protrusions that are spaced apart from one another. In some examples, the plurality of spacing protrusions extend in parallel to one another. In some examples, the plurality of spacing protrusions can be spaced apart from one another in a vertical direction crossing the front-rear direction.

In some examples, the plurality of spacing protrusions can include a first protrusion that is disposed at a lower part of the connection portion and has a first length in the front-rear direction, and a second protrusion that is disposed above the first protrusion and has a second length in the front-rear direction greater than the first length. In some examples, the plurality of spacing protrusions can further include a third protrusion that is disposed above the second protrusion and has a third length in the front-rear direction greater than the second length.

In some implementations, the air cleaning module can include a filter housing that is disposed at the rear body and is in fluid communication with the suction hole, where the filter housing is configured to accommodate a filter disposed at the suction hole. In some examples, the filter housing can include a filter frame configured to surround a side surface of the filter, and a filter cover disposed at a rear surface of the filter frame, where the filter cover defines a suction grille that is in fluid communication with the suction hole.

In some implementations, the spacing protrusion can be disposed at a position corresponding to the filter cover. In some examples, the spacing protrusion can be one of a plurality of spacing protrusions that are spaced apart from one another in a vertical direction crossing the front-rear direction and that include a first protrusion facing a lower end of the filter cover, and a second protrusion that is disposed above the first protrusion in the vertical direction and faces a middle portion of the filter cover disposed above the lower end of the filter cover.

In some examples, the first protrusion can have a first length in the front-rear direction, and the second protrusion can have a second length in the front-rear direction greater than the first length. In some examples, the plurality of spacing protrusions can further include a third protrusion that is disposed above the second protrusion in the vertical direction and faces an upper end of the filter cover, where the third protrusion has a third length in the front-rear direction greater than the second length.

In some implementations, the suction hole can be defined outside the breathing space, and the discharge hole can be defined inside the breathing space. For example, in some implementations, the face guard can separate the discharge hole from the suction hole.

In some examples, the suction hole is one of a plurality of suction holes that include a left suction hole defined at a left side of the face guard and a right suction hole defined at a right side of the face guard. The spacing protrusion is one of a plurality of spacing protrusions that include a left protrusion that protrudes from a left surface of the connection portion at the left side of the face guard, and a right protrusion that protrudes from a right surface of the connection portion at the right side of the face guard.

In some examples, the outer surface of the connection portion can face and be exposed to the air cleaning module, where an inner surface of the connection portion is defined at an opposite side of the outer surface of the connection portion and faces the breathing space.

In some examples, the rear body can define the suction hole, where the front body covers a front side of the suction hole. The air cleaning module can include a fan disposed at the suction hole and a filter housing disposed rearward relative to the fan and configured to accommodate a filter, where the filter housing defines a suction grille that is in fluid communication with the suction hole.

The details of one or more implementations are set forth in the accompanying drawings and the description below. Other features will be apparent from the description and drawings, and from the claims.

DETAILED DESCRIPTION

Reference will now be made in detail to the implementations of the present disclosure, examples of which are illustrated in the accompanying drawings.

Figure 1:
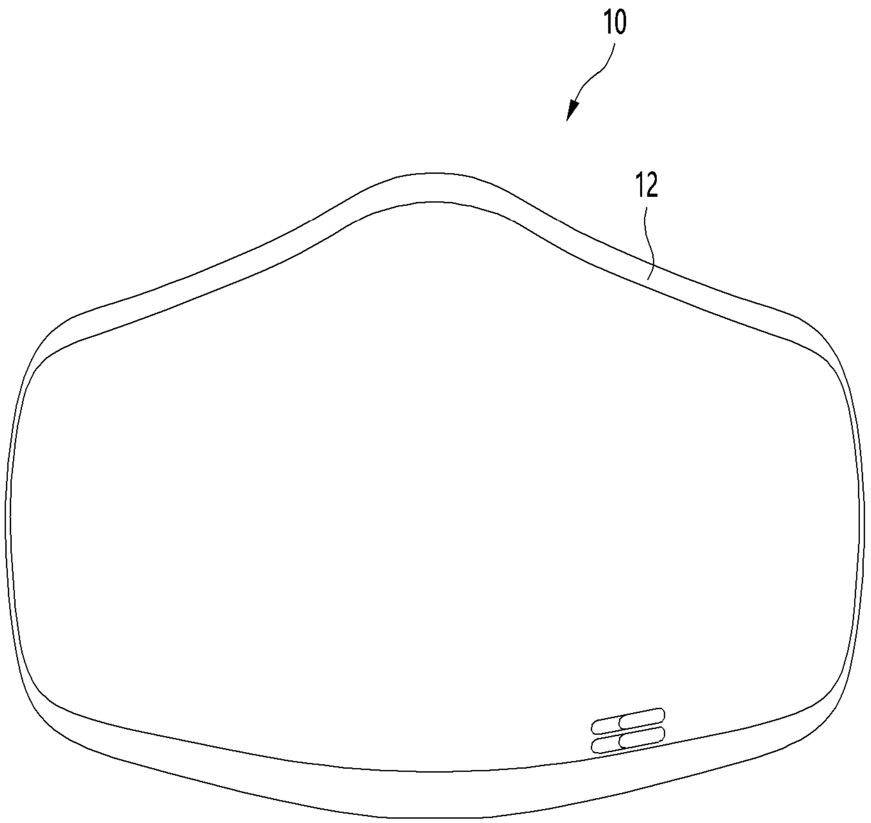
FIG. 1 is a front view showing an example of a mask apparatus.
Figure 2:
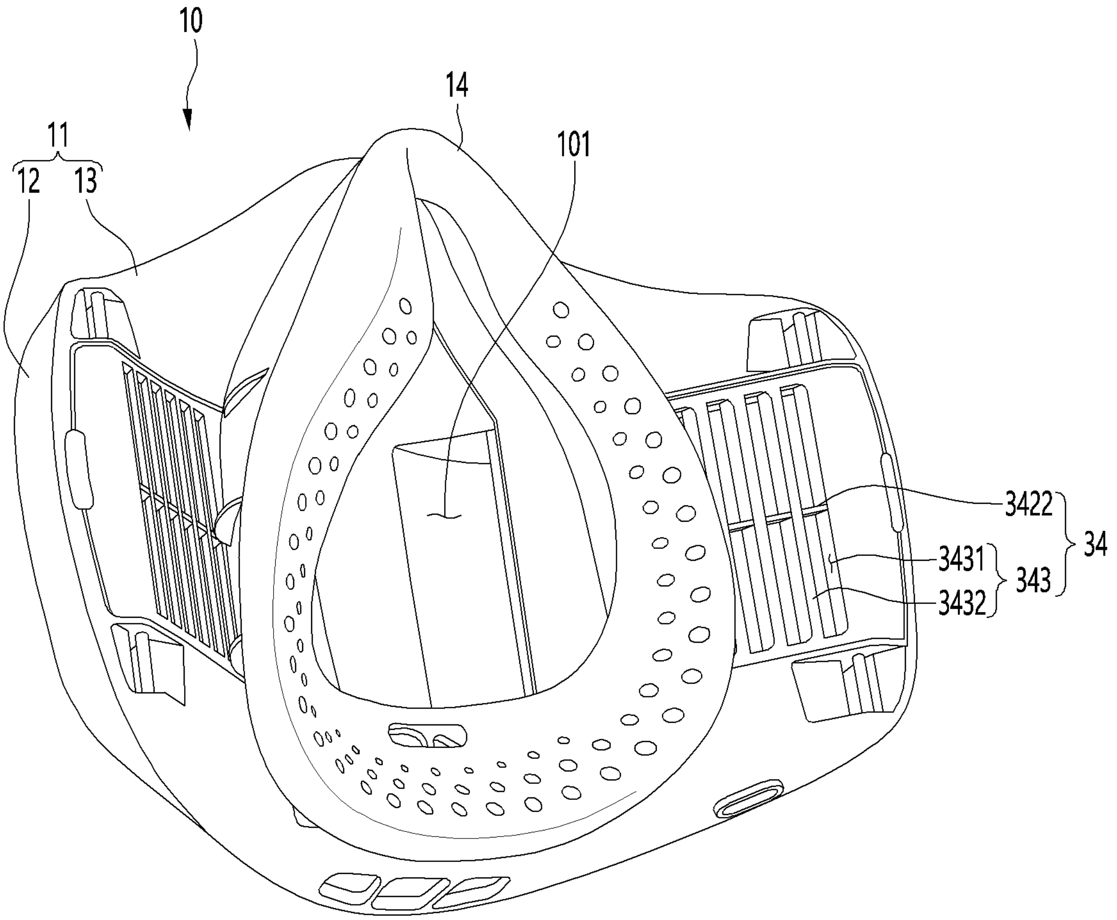
FIG. 2 is a rear perspective view of the mask apparatus.
Figure 3:
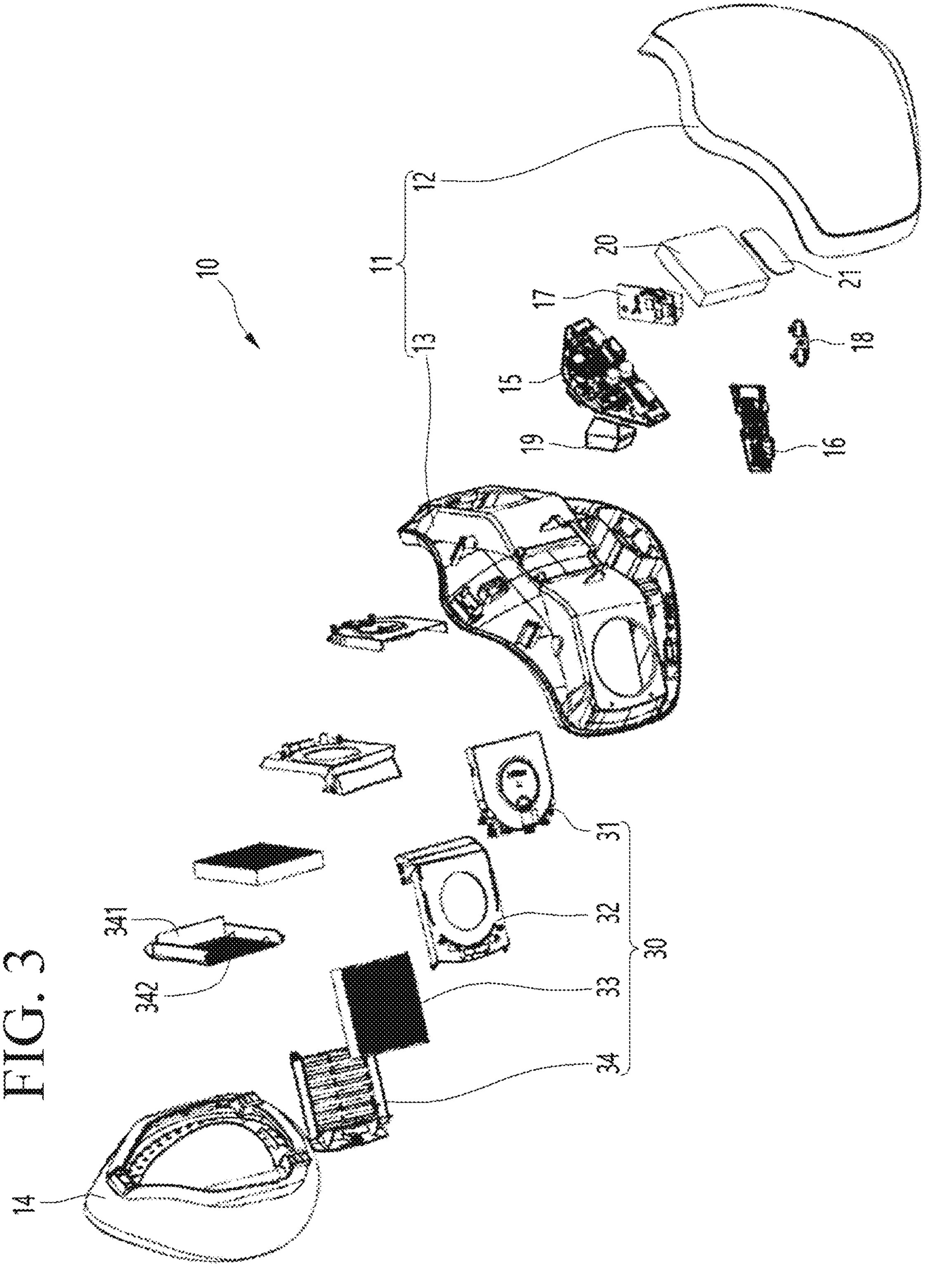
FIG. 3 is an exploded perspective view of the mask apparatus.
Figure 4:
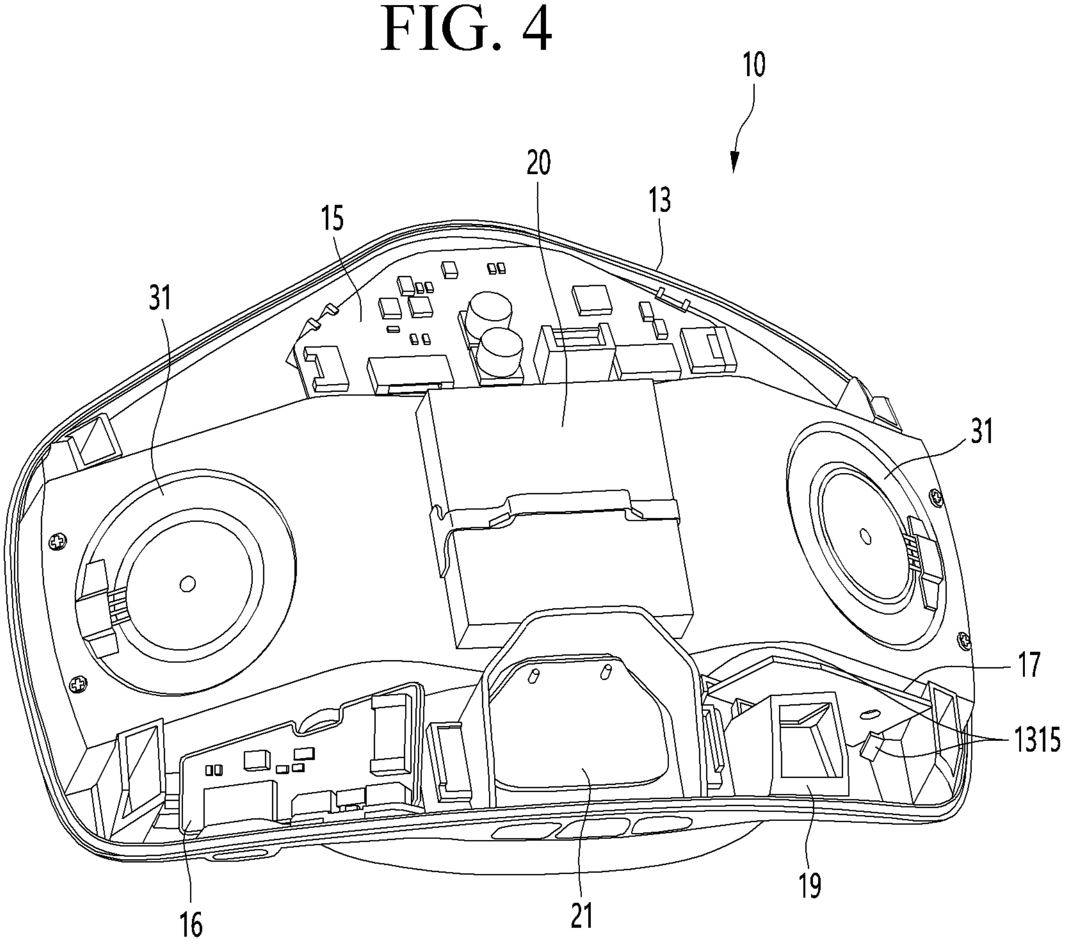
FIG. 4 is a front perspective view of the mask apparatus from which a front body is separated.

FIG. 1 is a front view showing an example of a mask apparatus, FIG. 2 is a rear perspective view of the mask apparatus, FIG. 3 is an exploded perspective view of the mask apparatus, and FIG. 4 is a front perspective view of the mask apparatus from which a front body is separated.

In some implementations, referring to FIGS. 1 to 4, a mask apparatus 10 includes a mask body 11, a face guard 14 that is fixedly or detachably coupled to a rear surface of the mask body 11, and an air cleaning module 30 mounted inside the mask body 11.

For example, the mask body 11 includes a front body 12 defining an outer appearance of a front surface and a rear body 13 coupled to a rear surface of the front body 12 to define an outer appearance of a rear surface. The front surface of the front body 12 defines a front surface of the mask apparatus 10, and the rear surface of the rear body 13 faces a face of a user (or a wearer).

In some implementations, the face guard 14 can be coupled to the rear surface of the rear body 13 so as to be in close contact with the user's face and can be made of a silicone or rubber material having elasticity. A breathing space is defined inside the face guard 14, and when the user wears the mask apparatus 10, a user's nose and mouth are accommodated in the breathing space. Thus, external air purified while passing through the air cleaning module 30 is guided to the breathing space and inhales by the user, and air generated when the user exhales is also discharged into the breathing space.

In some implementations, a predetermined space can be defined between the front body 12 and the rear body 13, and as illustrated in FIG. 4, accommodate various electrical components mounted on the front surface of the rear body 13. In addition, the various electrical components are shielded by the front body 12 so as not to be exposed to the outside.

In addition, the air cleaning module 30 includes a fan module 31 placed in an accommodation portion 133 (see FIG. 6) provided in the rear body 13 and a filter 33 placed behind the fan module 31. The fan module 31 includes a centrifugal fan that suctions air in an axial direction to discharge the air in a radial direction.

The air cleaning module 30 further includes a filter housing 34 disposed behind the filter 33, and a suction hole through which external air is suctioned is defined in the filter housing 34. The filter housing 34 can be rotatably coupled to the rear body 13, and the suction hole can be provided in the form of a suction grille 343 as illustrated in the drawings.

In detail, the filter housing 34 includes a filter frame 341 surrounding three side surfaces of the filter 33, and a filter cover 342 disposed on a rear surface of the filter frame 341. The filter cover 342 includes a suction grille 343.

The suction grille 343 can be understood as a structure including a plurality of suction slits 3431 and a plurality of partition ribs 3432 disposed between the adjacent suction slits 3431. The suction grille 343 can be understood as a structure in which one large suction hole is divided into a plurality of narrow and long suction slits 3431 by the plurality of partition ribs 3432. In addition, the plurality of narrow and long suction slits 3431 can be divided into an upper slit and a lower slit by a reinforcing rib 3422. Hereinafter, the suction hole defined in the rear surface of the mask apparatus 10 to suction the external air is defined as including various types of holes including the suction grille 343, and the suction hole of the mask body 11 can refer to the suction grille 343 in some examples.

In addition, a discharge hole 101 is defined at a point spaced apart from the suction hole in a central direction of the rear body 13. The external air suctioned through the suction hole or the suction grille 343 by an operation of the fan module 31 sequentially passes through the filter 33 and the fan module 31 and then is discharged into the breathing space through the discharge hole 101.

For example, the suction hole, i.e., the suction grille 343, can be disposed outside the face guard 14, and the discharge hole 101 is disposed inside the face guard 14. That is, the suction grille 343 is disposed outside the breathing space, and the discharge hole 101 is defined inside the breathing space, and thus, the suctioned external air and the air exhaled by the user are not mixed with each other.

The air cleaning module 30 further includes a flow guide 32 disposed behind the fan module 31.

In addition, the mask apparatus 10 further includes at least one of a main control module 15, a power module 16, an indicator module 18, a wireless communication module 17, a speaker module 19, and a battery 20, or an exhaust valve 21.

In detail, the main control module 15 is a module for controlling operations of the fan module 31, the speaker module 19, and a pressure sensor and a microphone, which will be described later. The main control module 15 can be disposed on an upper portion of a center of the front surface of the rear body 13.

The power module 16 is a control module for supplying power to the electric components mounted on the mask apparatus 10. The power module 16 can be disposed at a right lower end of the front surface of the rear body 13.

A cable connector, into which a terminal of a cable for power supply and data transmission is inserted, and an LED module used to inform an operation state of the mask apparatus 10 can be mounted on the power module 16. Then, light irradiated from the LED module is diffused and guided through the indicator module 18 and then is emitted to the outside of the mask apparatus 10.

The wireless communication module 17 can be any one of various types of short-range wireless communication modules including Bluetooth. The wireless communication module 17 can be disposed on a left lower end of the front surface of the rear body 13. The wireless communication module 17 can be mounted on the front surface of the rear body 13 in a direction crossing the rear body 13, for example, horizontally. The wireless communication module 17 can be mounted on the front surface of the rear body 13 in a horizontal state by a pair of substrate insertion ribs 1315 protruding from the front surface of the rear body 13. Both side ends of the wireless communication module 17 are supported by the pair of substrate insertion ribs 1315.

The speaker module 19 can be disposed on the left lower end of the front surface of the rear body 13 corresponding to a lower side of the wireless communication module 17.

The battery 20 can be disposed at a center of the front surface of the rear body 13, and the exhaust valve 21 can be disposed to shield an exhaust port provided below the center of the front surface of the rear body 13. That is, when the user exhales, the exhaust valve 21 can open the exhaust port, and when the user inhales, the exhaust valve 21 can block the exhaust port. The exhaust valve 21 can be bent and provided in the form of a flat flap.

Here, it should be noted that the front, rear, left, and right sides of the mask body 11 are defined based on a state in which the user wears the mask apparatus 10.

Figure 5:
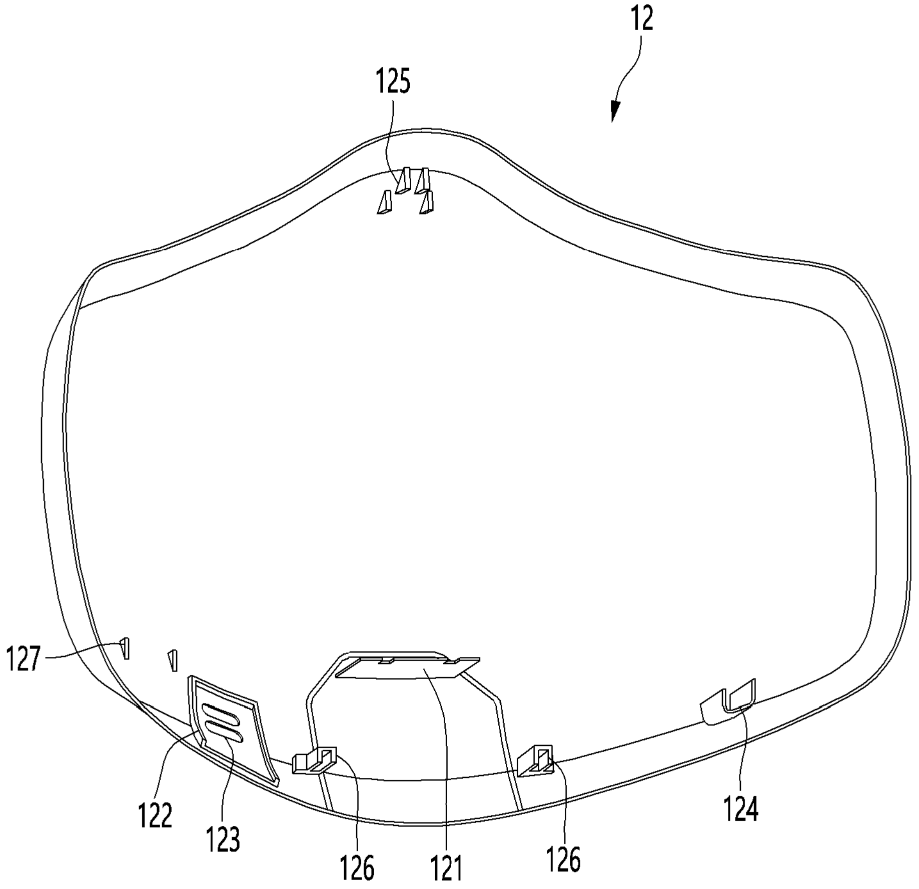
FIG. 5 is a rear perspective view showing an example of a front body of the mask apparatus.

FIG. 5 is a rear perspective view of the front body of the mask apparatus.

Referring to FIG. 5, the front body 12 of the mask apparatus 10 can define an outer appearance of the front surface of the mask apparatus 10.

When the front surface of the front body 12 is provided as a single body without a separate component mounted thereon, it has the advantage of being clean in outer appearance. When the suction hole is defined at each of the left and right sides of the front body 12, if the suction hole is placed to face an upper side after taking off the mask apparatus 10, there is disadvantage in that possibility, in which foreign substances are introduced into the mask apparatus 10 through the suction hole, is high.

In addition, when a separate cover is installed to shield the suction hole, thereby minimizing the inflow of the foreign substances, a gap needs to be defined between an edge of the cover and the front surface of the front body 12 so that external air is introduced. That is, there is a restriction that the separate cover has to be coupled to the front surface of the front body 12 in the form that protrudes from the front surface of the front body 12.

As a result, there is a high possibility that the separate cover is damaged by external force or be separated from the front body 12 by being caught by a surrounding obstacle. For this reason, it is advantageous in appearance to design the front body 12 so that the suction hole for inhaling the external air is not defined as much as possible to prevent a separate component from protruding due to additional mounting of the separate component on the front surface of the front body 12, and also it is advantageous for securing durability.

In consideration of this aspect, the suction hole for suctioning the external air is not defined in the front surface of the front body 12, and also, additional components including the cover are not mounted at all, and thus, the front surface is designed so that a smooth and continuous single surface is provided. However, a speaker hole 123 is defined in a side of the lower portion so that user's voice is output to the outside.

A plurality of protrusion structures are disposed on the rear surface of the front body 12.

In detail, one or plurality of substrate fixing ribs 125 protrude from an upper end of the center of the rear surface of the front body 12. The one or plurality of substrate fixing ribs 125 can press a front surface of the main control module 15 mounted on the rear body 13 when an edge of the front body 12 is coupled to an edge of the front surface of the rear body 13 to prevent the main control module 15 from being oscillated.

A valve support rib 121 horizontally protrudes from the rear surface of the front body 12. The valve support rib 121 is disposed at a point at which an upper end of the exhaust valve 21 is disposed when the front body 12 is coupled to the rear body 13, to press an upper end of a front surface of the exhaust valve 21. For example, the valve support rib 121 can have a predetermined width and extend backward by a predetermined length at a point spaced a predetermined distance downward from the center of the rear surface of the front body 12.

In addition, a pair of magnet pressing ribs 126 can protrude from the rear surface of the front body 12. In detail, the face guard 14 is mounted on the rear surface of the rear body 13, a magnet is mounted on a front surface of the face guard 14, and a magnet that is attractive to the magnet is mounted on the front surface of the rear body 13. As a result, the face guard 14 is detachably mounted on the rear surface of the rear body 13 by the magnetic force of the magnet.

In some implementations, a pair of lower magnet mounting portions 135 (see FIG. 6) for mounting the magnet are disposed on the front surface of the rear body 13. In addition, the pair of magnet pressing ribs 126 function to press the pair of magnets mounted on the pair of lower magnet mounting portions 135, respectively.

In addition, a substrate pressing rib 127 that is in contact with a front end of a substrate of the wireless communication module 17 protrudes from the rear surface of the front body 12. In detail, when the front body 12 and the rear body 13 are coupled to each other, the substrate pressing rib 127 presses the front end of the substrate of the wireless communication module 17 to prevent the wireless communication module 17 from being oscillated or being separated from the substrate insertion rib 1315.

In addition, a support rib 122 supporting and surrounding an edge of the front end of the speaker module 19 is disposed on the rear surface of the front body corresponding to an edge of the speaker hole 123. The support rib 122 can be surrounded in a shape corresponding to a shape of the front surface of the speaker module 19.

In addition, a substrate fixing rib 124 for pressing a front surface of the power module 16 protrudes from the rear surface of the front body 12. The substrate fixing rib 124 presses a front surface of the substrate of the power module 16 to prevent the power module 16 from oscillated or being separated from the rear body 13.

Figure 6:
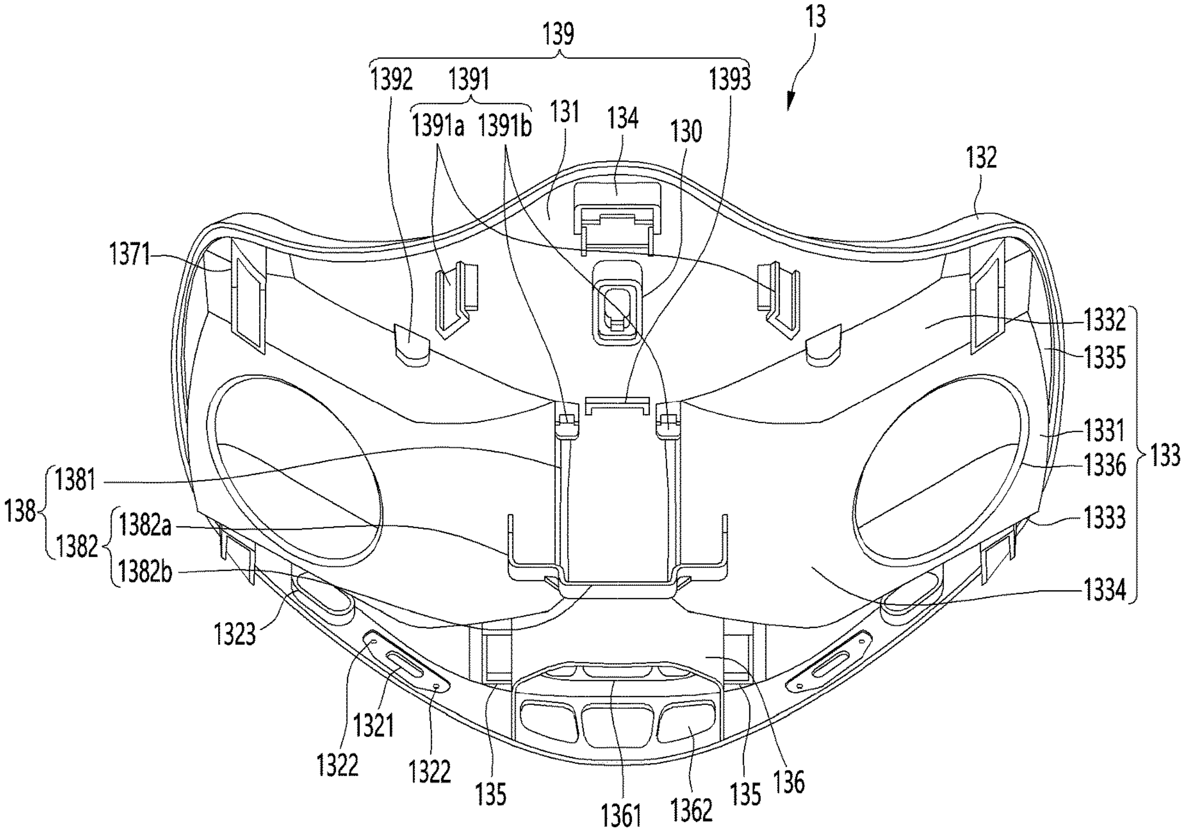
FIG. 6 is a front perspective view showing an example of a rear body of the mask apparatus.
Figure 7:
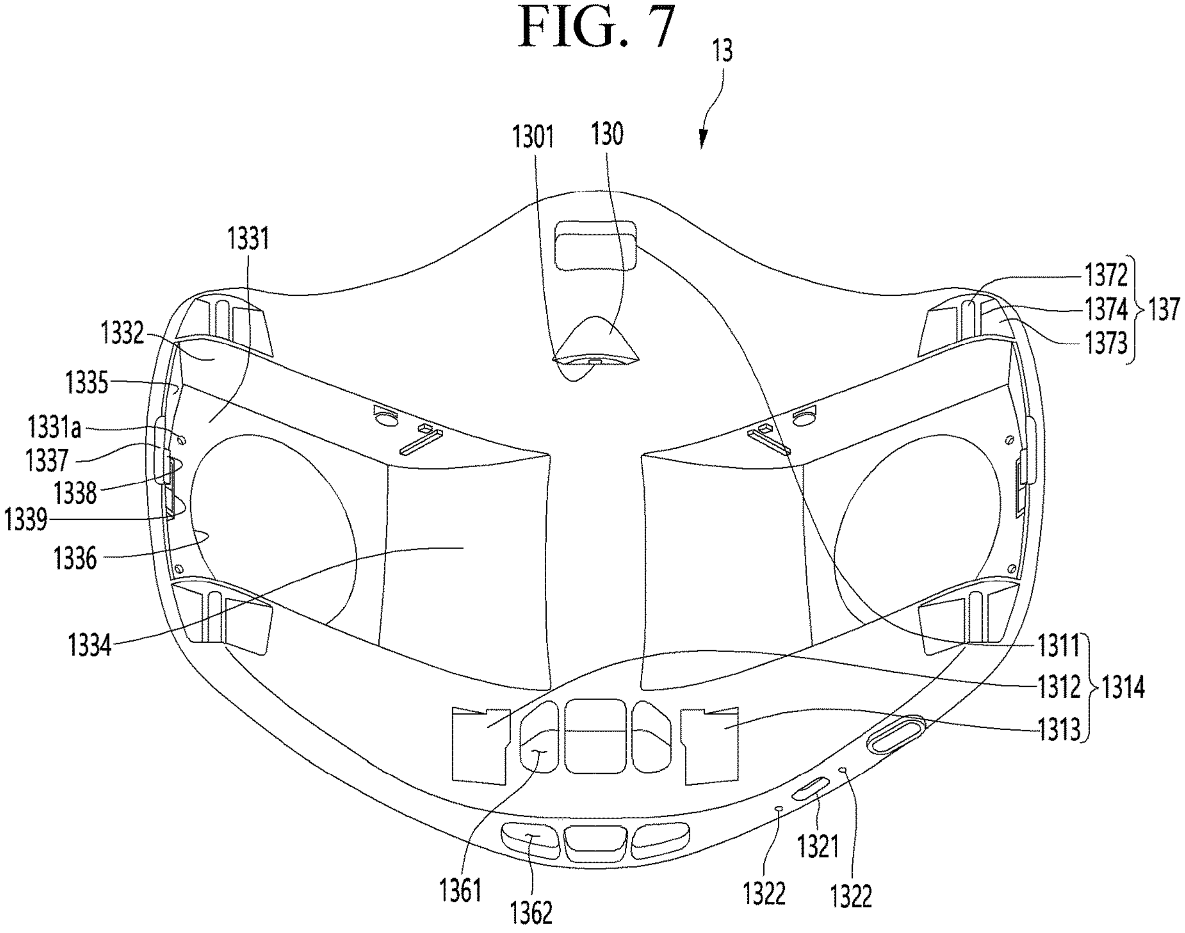
FIG. 7 is a rear perspective view of the rear body.

FIG. 6 is a front perspective view of the rear body of the mask apparatus, and FIG. 7 is a rear perspective view of the rear body.

In some examples, referring to FIGS. 6 and 7, the rear body 13 of the mask apparatus 10 can include a face cover portion 131 that covers a user's face and a fusion portion 132 bent forward from an edge of the face cover portion 131.

In detail, the fusion portion 132 is continuously disposed along an edge of a top surface, edges of both surfaces, and an edge of a bottom surface of the face cover portion 131. In addition, a width of the fusion portion 132 in a front and rear direction, which is bent along an edge of a bottom surface of the face cover portion 131 to extend forward is the largest.

In the fusion portion 132, a portion disposed on the edge of the bottom surface of the face cover portion 131 can be specifically defined as an extension protrusion. The extension protrusion has a convexly rounded shape in such a manner that a width in the front and rear direction gradually increases from both side ends of the rear body 13 toward the center.

In some examples, a bottom exhaust port (e.g., hole) 1362 can be disposed at a center of the fusion portion 132 defined as the extension protrusion, and a button hole 1321 is defined at a point spaced apart from the bottom exhaust port 1362 toward a side end of the rear body 13. A power button is inserted into the button hole 1321. An indication hole 1322 is defined at a point spaced apart from each of left and right edges of the button hole 1321.

Light irradiated from a light emitting unit mounted on the power module 16 is emitted to the outside through the pair of indication holes 1322. The light emitting unit includes an LED module.

In some examples, the light can be emitted to the outside through any one of the pair of indication holes 1322 when the power of the mask apparatus 10 is turned on. In addition, a remaining amount of battery 20 can be predicted according to a color of the light emitted through the other one of the pair of indication holes 1322.

A terminal insertion hole 1323 is defined at a point further spaced apart from the button hole 1321 toward the side end of the rear body 13. A universal serial bus (USB) cable can be inserted into a terminal connector provided in the power module 16 through the terminal insertion hole 1323. The battery 20 is charged through the USB cable, and a version or function of the mask apparatus 10 can be updated or upgraded by data transmitted through the USB cable.

In some examples, an accommodation portion 133 for accommodating the air cleaning module 30 can be provided in the rear body 13. The accommodation portion 133 is provided at each of left and right sides from the center of the rear body 13, and the pair of accommodation portions 133 are symmetrical with respect to a vertical line passing through the center of the rear body 13.

The accommodation portion 133 protrudes forward from the front surface of the face cover portion 131 to define a space in which the air cleaning module 30 is accommodated. The accommodation portion 133 includes a seating surface 1331 on which the air cleaning module 30, specifically, the fan module 31 is seated, a coupling surface 1335 connecting an outer edge of the seating surface 1331 at a side end of the face cover portion 131, and an air guide surface 1334 connecting the front surface of the face cover portion 131 at an inner edge of the seating surface 1331.

In addition, the accommodation portion 133 further include a top surface 1332 connecting upper ends of the seating surface, the air guide surface 1334, and the coupling surface 1335 to the front surface of the face cover portion 131. In addition, the accommodation portion 133 further include a bottom surface 1333 connecting lower ends of the seating surface, the air guide surface 1334, and the coupling surface 1335 to the front surface of the face cover portion 131.

One or more coupling units, for example, coupling hooks, are disposed on the coupling surface 1335.

A fan mounting hole 1336 can be defined in the seating surface 1331, and the top surface 1332 and the bottom surface 1333 can extend horizontally and extend parallel to each other. In some examples, the suction hole can refer to the fan mounting hole 1336 that is in fluid communication with the suction grille 343.

The coupling surface 1335 can be convexly rounded toward the outside of the rear body 13 and be inclined toward the center of the rear body 13 from the face cover portion 131 to the seating surface 1331.

The air guide surface 1334 can be designed to extend convexly and roundly from the seating surface 1331 toward the face cover portion 131 so that air suctioned by the fan module 31 is smoothly guided toward the discharge hole 101 along the air guide surface 1334.

As another example, the air guide surface 1334 is constituted by a round portion that is rounded with a predetermined curvature at the inner edge of the seating surface 1331 and an inclined portion connecting the face cover portion 131 flatly and obliquely at an end of the round portion.

The accommodation portion 133 includes a left accommodation portion disposed at the left side from the center of the rear body 13 and a right accommodation portion disposed at the right side from the center of the rear body 13. The left accommodation portion and the right accommodation portion are spaced a predetermined distance from the center of the rear body 13, and the battery 20 is mounted in a space between the left accommodation portion and the right accommodation portion.

A battery mounting portion 138 can be disposed on the front surface of the rear body 13. In detail, the battery mounting portion 138 includes a pair of battery seating ribs 1381 and a battery support rib 1382.

The pair of battery seating ribs 1381 protrude forward from the front surface of the face cover portion 131 or an edge of the air guide surface 1334 to extend in parallel in the vertical direction. The pair of battery seating ribs 1381 supports a rear surface of the battery 20.

One end of the battery support rib 1382 extends from either one of the left air guide surface 1334 and the right air guide surface 1334, and the other end is connected to the other side of the left air guide surface 1334 and the right air guide surface 1334.

The battery support rib 1382 has an n-shape to support the front and both surfaces of the battery 20. Thus, a phenomenon in which the battery 20 is separated from the rear body 13 can be prevented by the battery support rib 1382.

In addition, a central portion of the battery support rib 1382 protrudes forward so that a battery having a different size is selectively mounted.

In detail, the battery support rib 1382 includes a pair of extension portions extending forward from the pair of air guide surfaces 1334 and a connection portion extending in a horizontal direction to connect the pair of extension portions to each other.

In addition, a portion of the connection portion is bent to extend forward, so that the battery support rib 1382 is described as being constituted by a first battery support 1382*a* and a second battery support 1382*b*. In detail, the first battery support 1382*a* can be used to support a relatively wide and thin battery, and the second battery support 1382*b* can be used to support a relatively narrow and thick battery.

The second battery support 1382*b* can be described as being provided by bending a portion of the connection portion of the first battery support 1382*a* forward a plurality of times. Alternatively, it can be described that the relatively small n-shaped second battery support 1382*b* protrudes from a front surface of the relatively large n-shaped first battery support 1382*a*.

An exhaust passage guide 136 protrudes forward from the front surface of the face cover portion 131 corresponding to a lower side of the battery mounting portion 138. In detail, the exhaust passage guide 136 is disposed below the battery mounting portion 138, and a lower end of the battery 20 mounted on the battery mounting portion 138 is supported by a top surface of the exhaust passage guide 136. As a result, it is possible to prevent the battery 20 from being pulled downward due to gravity while being inserted into the battery mounting portion 138.

The exhaust passage guide 136 can have a substantially tunnel-shaped longitudinal cross-section, and a front exhaust port 1361 can be disposed on the face cover portion 131 corresponding to the inside of the exhaust passage guide 136.

At least one of the front exhaust port 1361 or the bottom exhaust port 1362 can be provided in the form of an exhaust grille divided into a plurality of small exhaust ports by a plurality of grilles or partition ribs. In addition, the front exhaust port 1361 is selectively opened and closed by the exhaust valve 21.

An upper magnet mounting portion 134 is disposed at the upper end of the center of the front surface of the face cover portion 131, and a pair of lower magnet mounting portions 135 are disposed on a lower end of the front surface of the face cover portion 131.

In detail, the lower magnet mounting portion 135 is disposed on each of a left edge and a right edge of the exhaust passage guide 136. The magnet mounted on the lower magnet mounting portion 135 is pressed by the pair of magnet pressing ribs 126 (see FIG. 5) protruding from the rear surface of the front body 12.

A strap connection portion 137 is disposed at each of the left end and the right end of the rear body 13. In detail, the strap connection portion 137 is a portion to which an end of a strap or band that is caught on the user's ear or wraps around the back of the user's head is connected. The strap connection portion 137 is disposed at each of upper and lower portions of the left and right ends of the rear body 13.

Both ends of any one of the pair of straps can be respectively connected to the strap connection portions 137 provided at the upper left and lower ends, and both ends of the other one can be respectively connected to the strap connection portions 137 provided at the upper right and lower ends. Then, the pair of straps can be hung on both user's ears, respectively.

As another method, both ends of any one of the pair of straps can be respectively connected to the strap connection portions 137 provided at the upper left and right ends, and both ends of the other one can be respectively connected to the strap connection portions 137 provided at the lower left and right ends. Then, the pair of straps can be wrapped around the user's back of the head.

Each of the four strap connection portions 137 includes a strap groove 1373 that is recessed from the front surface of the rear body 13 to extend in the horizontal direction (width direction of the rear body), a strap hole 1374 defined in any point of the strap groove 1373, a strap bar 1372 connecting top and bottom surfaces of the strap groove 1373 to each other, and a tubular waterproof rib 1371 extending from the rear surface of the rear body 13 corresponding to an edge of the strap hole 1374.

A main control module mounting portion 139 is disposed on the front surface of the rear body 13.

In detail, the main control module mounting portion 139 includes a substrate fixing hook 1391 protruding forward from the front surface of the face cover portion 131 and a substrate seating rib 1393 and substrate support rib 1392, which support a rear surface of the main control module 15.

In detail, the substrate fixing hook 1391 can include a pair of first substrate fixing hooks 1391*a* disposed above the accommodation portion 133 and a pair of second substrate fixing hooks 1391*b* disposed between the pair of accommodation portions 133 facing each other.

The pair of first substrate fixing hooks 1391*a* can be disposed at a point spaced upward from a top surface of the left accommodation portion and at a point spaced upward from a top surface of the right accommodation portion. The pair of first substrate fixing hooks 1391*a* function to fix left and right ends of the main control module 15.

In addition, the pair of second substrate fixing hooks 1391*b* can be respectively disposed at points corresponding to inner upper ends of the pair of accommodation portions 133. In detail, any one of the pair of second substrate fixing hooks 1391*b* can be disposed at a point at which an upper edge of the right accommodation portion meets the front surface of the face cover portion 131. In addition, the other of the pair of second substrate fixing hooks 1391*b* can be disposed at a point at which an upper edge of the left accommodation portion meets the front surface of the face cover portion 131.

The pair of second substrate fixing hooks 1391*b* function to fix a lower end of the control substrate of the main control module 15.

In addition, the substrate support rib 1392 can protrude from the front surface of the face cover portion 131 corresponding between the pair of second substrate fixing hooks 1391*b* to support a rear surface of the lower end of the control substrate of the main control module 15.

In addition, a rear surface of the upper end of the main control module 15 can be supported by a front end of the upper magnet mounting portion 134. The main control module 15 is disposed to be spaced apart from the face cover portion 131 by the upper magnet mounting portion 134 and the substrate seating rib 1393, and thus, there is an effect that the main control module 15 is stably coupled to the rear body without oscillated by the substrate fixing hook 1391.

A pressure sensor mounting portion (or breathing sensor mounting portion) 130 can be disposed at a center of the upper portion of the front surface of the face cover portion 131. A pressure sensor (to be described later) mounted on the pressure sensor mounting portion 130 senses a pressure in the breathing space defined inside the face guard 14. That is, it can be determined whether the user is currently inhaling or exhaling according to a change in pressure inside the breathing space. The pressure sensor can be defined as a breathing sensor, and although the terms are different, it should be understood as a sensor performing the same function.

The pressure sensor mounting portion 130 is provided on the front surface of the rear body 13, and when the main control module 15 is mounted on the main control module mounting portion 139, the pressure sensor mounting portion 130 is disposed at a point at which the pressure sensor (or breathing sensor) mounted on the rear surface of the main control module 15 is disposed. Thus, when the main control module 15 is mounted to the main control module mounting portion 139, the pressure sensor is accommodated in the pressure sensor mounting portion 130. In addition, a front end of the pressure sensor mounting portion 130 is in close contact with the rear surface of the control substrate of the main control module 15.

In addition, a portion defining a bottom of the pressure sensor mounting portion 130 protrudes to a rear side of the rear body 13, and a through-hole 1301 is defined in a bottom surface of the portion protruding backward. The breathing space defined by the rear surface of the rear body 13 and the face guard 14 and an inner space of the pressure sensor mounting portion 130 communicate with each other through the through-hole 1301. As a result, a portion of air generated when the user exhales flows into the inner space of the pressure sensor mounting portion 130 through the through-hole 1301. In addition, the pressure sensor accommodated in the pressure sensor mounting portion 130 senses a pressure inside the pressure sensor mounting portion 130. Then, the sensed pressure value is transmitted to a microcomputer (to be described later) of the main control module 15 so that a user's breathing state is determined.

A magnet mounting groove 1314 is defined each of the rear surface of the rear body 13 corresponding to a direct rear surface of the upper magnet mounting portion 134 and the rear surface of the rear body 13 corresponding to a direct rear surface of the pair of lower magnet mounting portions 135.

The magnet mounting groove 1314 includes a first magnet mounting groove 1311 defined in a direct rear surface of the upper magnet mounting portion 134 and a second magnet mounting groove 1312 and a third magnet mounting groove 1313, which are defined in a direct rear surface of the lower magnet mounting portion 135.

Three magnets mounted on the face guard 14 are attached to the first to third magnet mounting grooves 1311 to 1313 by magnetic force, respectively. In addition, when the user pulls the face guard 14 with force greater than the magnetic force, the face guard 14 is easily separated from the rear body 13.

As described above, the fan mounting hole 1336 can be defined in the seating surface 1331 of the accommodation portion 133. In addition, one or plurality of flow guide coupling holes 1331*a* are defined at a point spaced apart from the fan mounting hole 1336 toward the outer edge of the seating surface 1331. The flow guide 32 is fixed to the accommodation portion 133 by a coupling member passing through the flow guide coupling hole 1331*a*.

In addition, a flow guide hook 1339 and a filter hook 1338 are disposed to be spaced apart from each other in the front and rear direction on the coupling surface 1335 of the accommodation portion 133. The flow guide hook 1339 is disposed closer to the seating surface 1331 than the filter hook 1338.

In addition, a gripping groove 1337 is defined at a side end of the rear surface of the rear body 13 corresponding to a rear side of the filter hook 1338. In detail, it can be described that the gripping groove 1337 is defined at a point at which the fusion portion 132 and the coupling surface 1335 meet each other.

Figure 8:
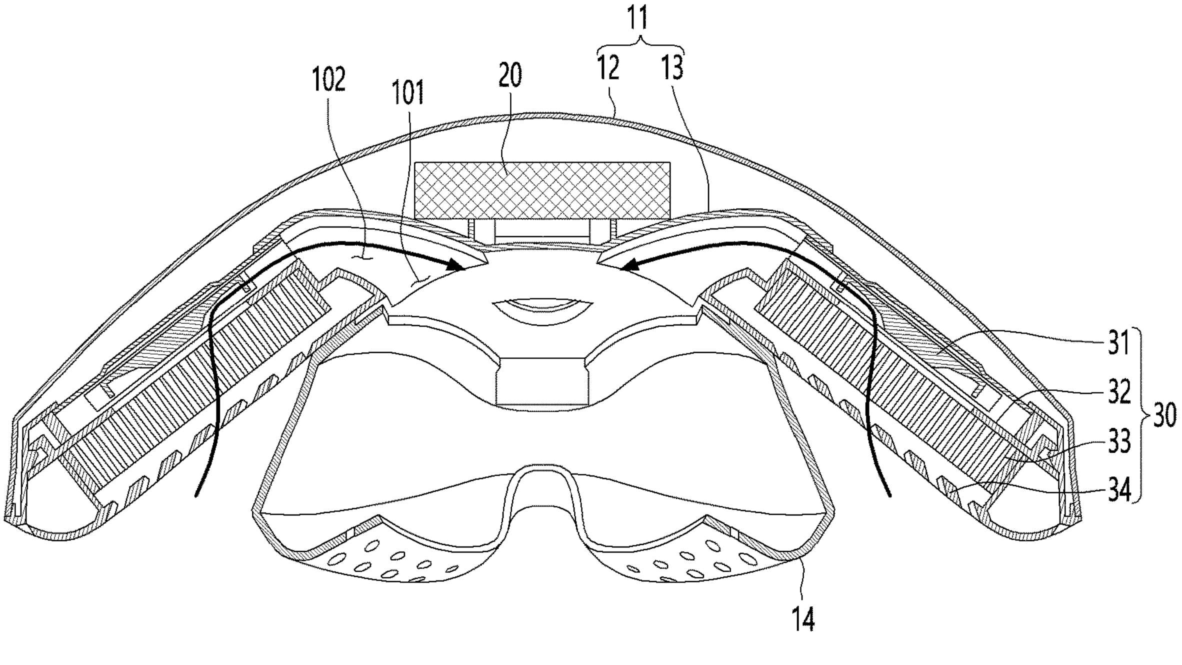
FIG. 8 is a transverse cross-sectional view of the mask apparatus.
Figure 9:
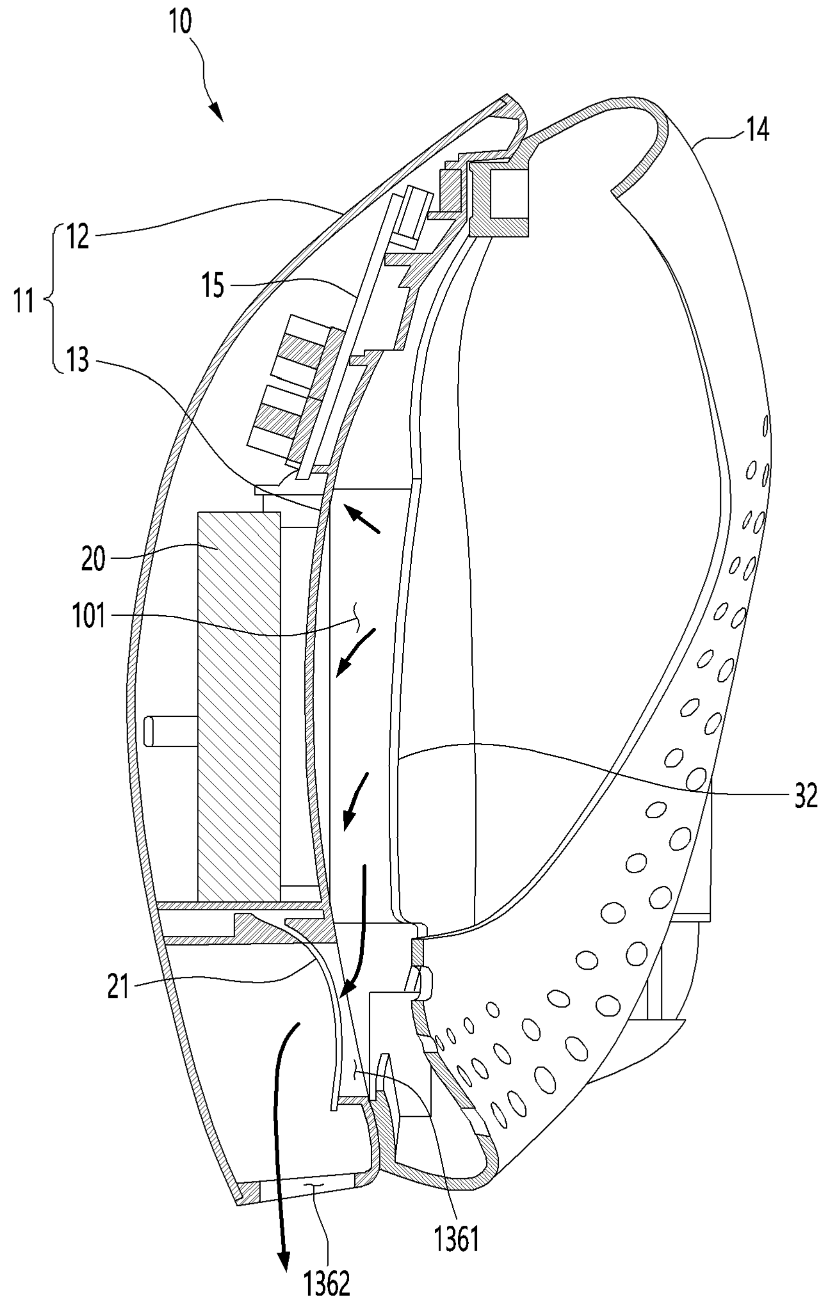
FIG. 9 is a longitudinal cross-sectional view of the mask apparatus.

FIG. 8 is a transverse cross-sectional view of the mask apparatus, and FIG. 9 is a longitudinal cross-sectional view of the mask apparatus.

Referring to FIGS. 8 and 9, when the user operates the fan module 31 by pressing the power button, external air is introduced into the mask apparatus 10 through the suction grilles 343 (or suction holes) disposed at the left and right sides of the rear surface of the mask apparatus 10.

The external air introduced through the suction grille 343 is purified while passing through the filter 33. Then, the air passing through the filter 33 is suctioned in an axial direction of the fan module 31 and then discharged in a radial direction.

As illustrated in FIG. 8, a front surface of the fan module 31 is seated on the seating surface 1331, and a rear surface of the fan module 31 is opened. In addition, the opened rear surface of the fan module 31 is shielded by the flow guide 32, and a communication hole serving as a suction hole of the fan module 31 is defined in the flow guide 32. The air passing through the filter 33 is introduced into the fan through the communication hole.

In some examples, an air duct 102 is defined between a side surface of the flow guide 32 and the air guide surface 1334.

In addition, an inlet of the air duct 102 communicates with an outlet (or discharge hole) of the fan module 31, and the outlet of the air duct 102 communicates with the discharge hole 101.

In addition, the discharge hole 101 is defined in the breathing space defined by the rear surface of the face guard 14 and the rear body 13. Therefore, the external air suctioned by the fan module 31 is discharged to the breathing space, so that the user inhales.

In addition, the air guide surface 1334 is provided to be smoothly rounded from the outlet of the fan module 31 toward the discharge hole 101, so that the air discharged in the radial direction of the fan module 31 is not sharply changed in flow direction while flowing toward the discharge hole 101.

In detail, in the case of the centrifugal fan, the discharge of the air in the axial suction and radial discharge are due to a shape of a cone or truncated cone hub. That is, the air suctioned in the axial direction of the centrifugal fan is smoothly changed in direction to 90 degrees along the round surface of the hub.

Here, since the rounded direction of the hub of the fan module 31 and the rounded direction of the air guide surface 1334 are the same, the air suctioned into the fan module 31 smoothly flows in only one direction.

If the suction grille 343 is provided on the front body 12, the suction hole of the fan module 31 faces the front body 12, and as a result, the rounded direction of the hub of the fan module is opposite to the rounded direction of the air guide surface 1334. As a result, the air discharged from the fan module 31 collides with the beginning of the air guide surface 1334 corresponding to the suction hole of the air duct 102 to generate flow resistance and flow noise.

That is, the air suctioned in the axial direction of the fan module 31 substantially generates an S-shaped flow, resulting in a greater flow loss than the structure, in which the C-shaped or n-shaped flow is generated.

When the user exhales, the air discharged through the user's mouth and nose is collected in the breathing space. A minute portion of the air collected in the breathing space is introduced into the pressure sensor mounting portion 130 through the through-hole 1301.

In addition, most of the air collected in the breathing space descends and is discharged to the outside through the front exhaust port 1361 and the bottom exhaust port 1362. Here, as the exhaust valve 21 is bent forward by the pressure of air generated when the user exhales, the front exhaust port 1361 is opened. In addition, when the user inhales, the pressure inside the breathing space is lower than atmospheric pressure, and the exhaust valve 21 returns to its original position to shield the front exhaust port 1361.

Figure 10:
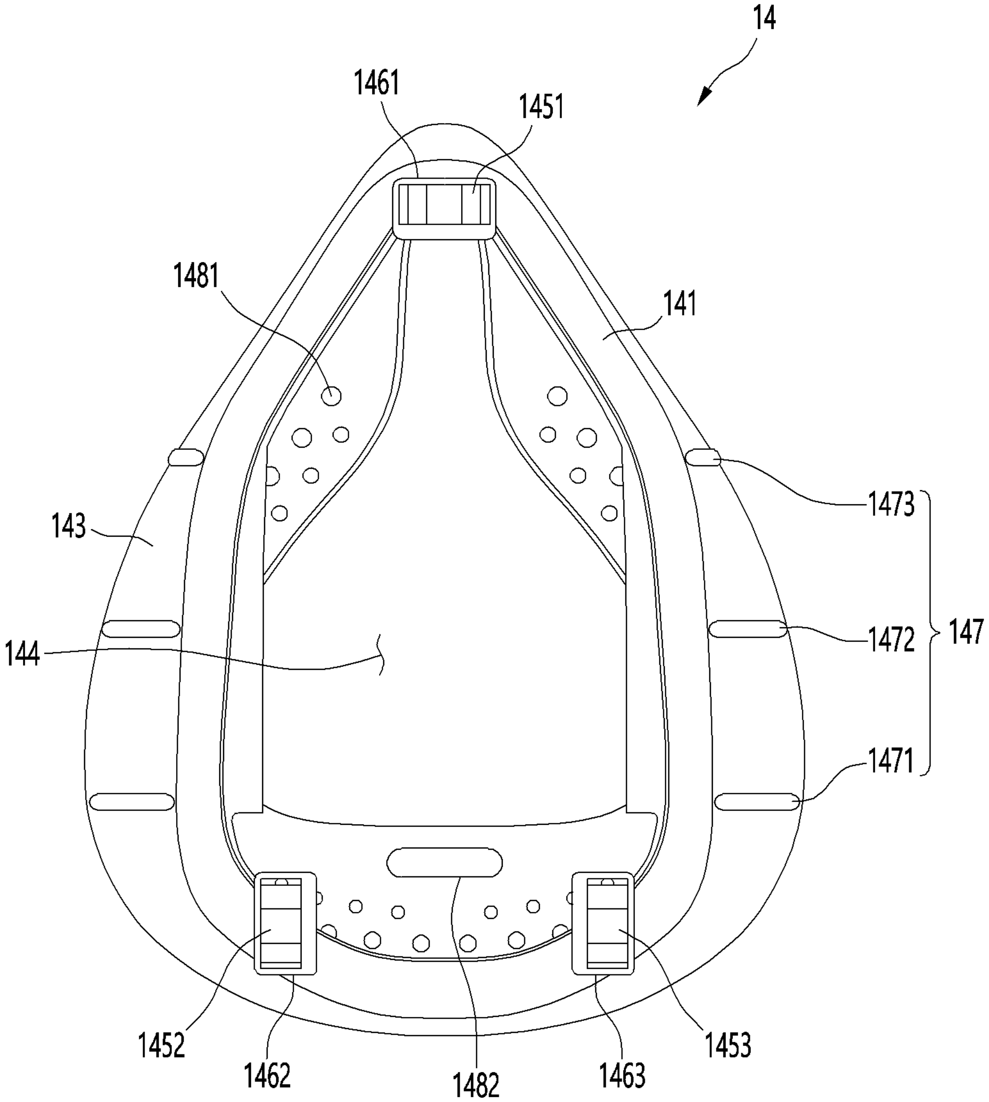
FIG. 10 is a front view showing an example of a face guard.
Figure 11:
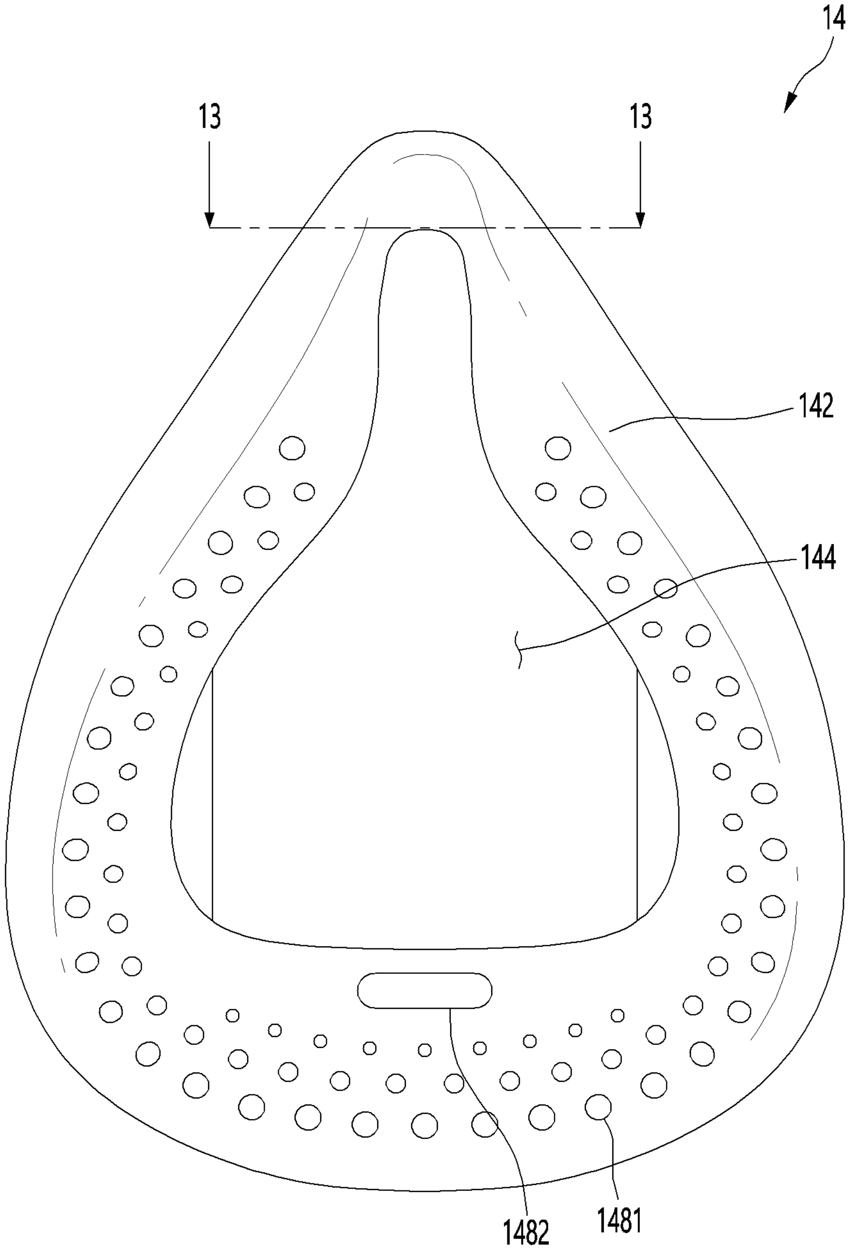
FIG. 11 is a rear view of the face guard.
Figure 12:
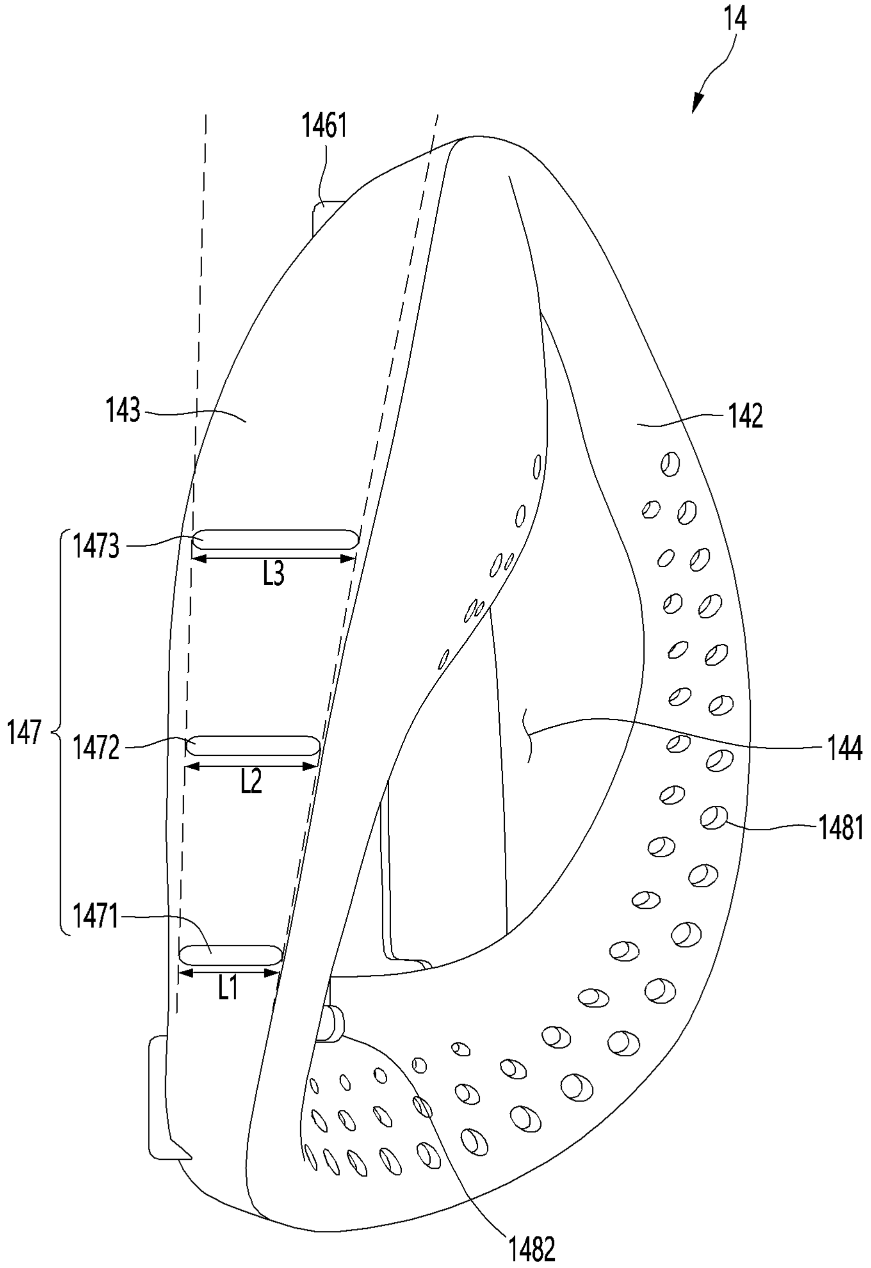
FIG. 12 is a side view of the face guard.
Figure 13:
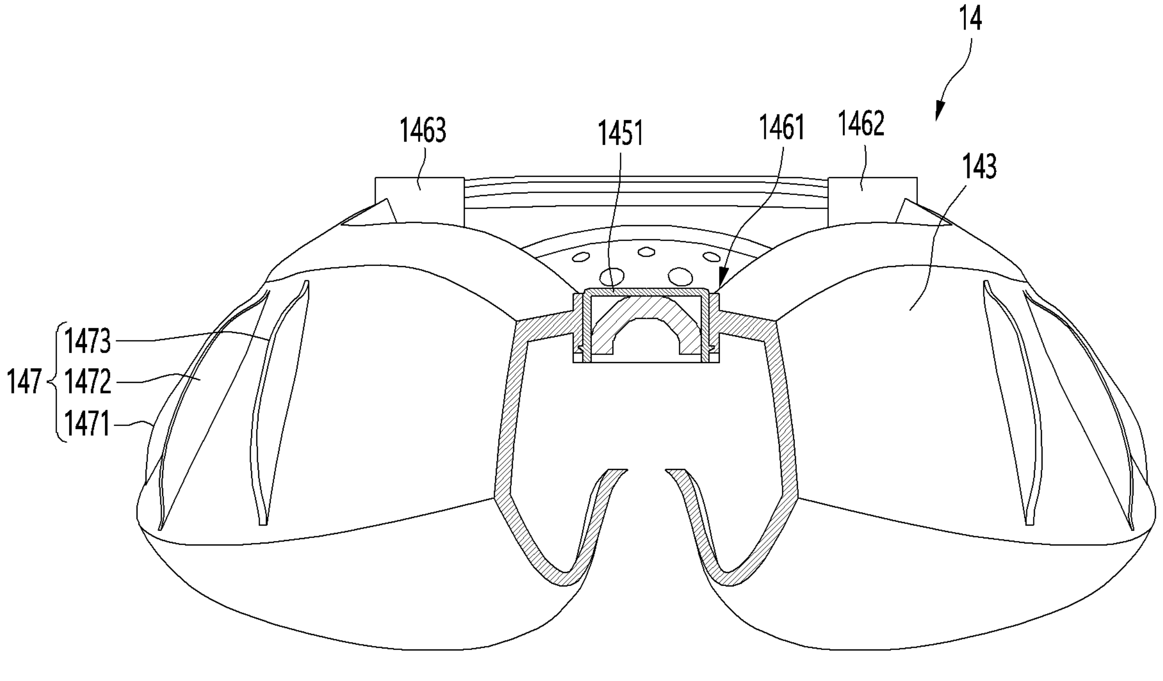
FIG. 13 is a partial cross-sectional view of the face guard, taken along line 13-13 of FIG. 11.
Figure 14:
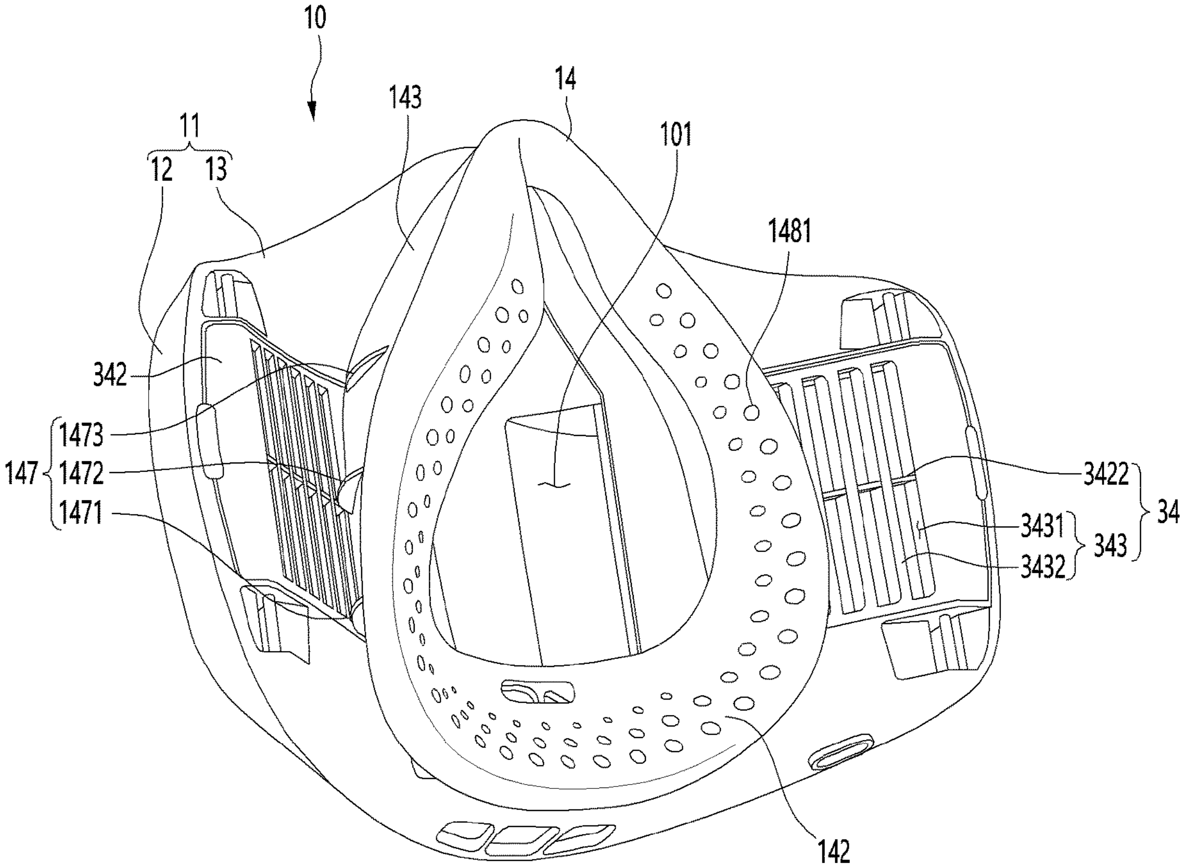
FIG. 14 is a rear perspective view showing the mask apparatus in which the face guard is mounted.

FIG. 10 is a front view of the face guard, FIG. 11 is a rear view of the face guard, FIG. 12 is a side view of the face guard, FIG. 13 is a partial cross-sectional view of the face guard, taken along line 13-13 of FIG. 11, and FIG. 14 is a rear perspective view of the mask apparatus in which the face guard is mounted.

Referring to FIGS. 10 to 14, the face guard 14 of the mask apparatus 10 can be fixedly or detachably coupled to the rear surface of the mask body 11 and be in close contact with and the user's face.

That is, a front surface of the face guard 14 can be in close contact with the rear surface of the rear body 13, and a rear surface of the face guard 14 can be in close contact with the user's face.

The face guard 14 can have a predetermined thickness and can be provided in a water droplet shape or a donut shape with an empty center. The face guard 14 can has a central portion passing from the front surface to the rear surface to provide an accommodation space 144 inside which the user's nose or mouth is accommodated.

The face guard 14 can be provided in a shape in which a width in the left and right direction becomes slim upward from a lower portion thereof. The accommodation space 144 is also defined to become narrower in width upward from a lower portion thereof. Thus, the user's mouth can be accommodated in a lower space of the accommodation space 144, and the user's nose can be accommodated in an upper space of the accommodation space 144. When the user wears the mask apparatus 10, the user's nose can be fixed to the upper portion of the face guard 14 and be in close contact with the upper portion of the face guard 14.

The face guard 14 can be made of a silicone or rubber material having elasticity and can be in close contact with the user's face to define the breathing space inside the face guard 40.

In detail, the face guard 14 can include a coupling portion 141 facing the rear surface of the rear body 13, a close contact portion 142 that is in close contact with the user's face, and a connection portion 143 connecting the coupling portion 141 to the close contact portion 142 and having a predetermined width in the front and rear direction. The coupling portion 141, the close contact portion 142, and the connection portion 143 can be integrated with each other.

In some examples, the face guard 14 can be described as including a front surface that is in close contact with the rear surface of the rear body 13, a rear surface that is in close contact with the user's face, and a side surface connecting the front surface to the rear surface and having a predetermined width in the front and rear direction.

The coupling portion 141 can be provided to be surrounded with a predetermined width along an edge of a front end of the face guard 14. The coupling portion 141 can be provided in a ring shape having a closed loop.

The coupling portion 141 is provided with a magnetic body mounting portion 146 on which a magnetic body that is attractive to a magnet mounted on the front surface of the rear body 13 is mounted.

The magnetic body mounting portion 146 can protrude forward from the coupling portion 141, and the magnetic body 145 can be inserted and mounted therein. The magnetic body mounting portion 146 can be provided in plurality.

In detail, the magnetic body mounting portion 146 includes a first magnetic body mounting portion 1461 disposed above the coupling portion 141 and second and third magnetic body mounting portions 1462 and 1463 disposed below the coupling portion 141 and spaced apart from each other in a lateral direction.

In some examples, the first magnetic body mounting portion 1461, the second magnetic body mounting portion 1462, and the third magnetic body mounting portion 1463 can have the same shape.

In some implementations, the first magnetic body mounting portion 1461 can be arranged to be elongated in the horizontal direction, and the second magnetic body mounting portion 1462 and the third magnetic body mounting portion 1463 can be arranged to be elongated in the vertical direction. That is, since the first to third magnetic body mounting portions 1461 to 1463 have the same shape or structure, the first magnetic body mounting portion 1461 will be representatively described below.

The first magnetic body mounting portion 1461 is disposed at a center of the upper end of the coupling portion 141, and the second magnetic body mounting portion 1462 and the third magnetic body mounting portion 1463 are disposed at points spaced apart from a center of the lower end of the coupling portion 141 in the lateral direction, respectively.

In addition, a first magnetic body 1451 is mounted inside the first magnetic body mounting portion 1461, a second magnetic body 1452 is mounted inside the second magnetic body mounting portion 1462, and a third magnetic body 1453 is mounted inside the third magnetic body mounting portion 1463.

According to this configuration, the face guard 14 can be easily fixed to the rear surface of the rear body 13 by only allowing the first to third magnetic bodies 1451 to 1453 to approach the first to third magnet mounting grooves 1311 to 1313.

In some implementations, one magnetic body 1451 exists above the face guard 14, and two magnetic bodies 1452 and 1453 exist below the face guard 14. Thus, the magnetic body 1451 disposed above the face guard 14 can be coupled first to the first magnet mounting groove 1311 so that the positions of the remaining two magnetic bodies 1452 and 1453 are smoothly induced to the positions of the second and third magnet mounting grooves 1312 and 1313.

Therefore, in some examples, the face guard 14 can be mounted to the rear body without aligning all of the three magnetic bodies 1451, 1452, and 1453 with the three magnet mounting grooves 1311, 1312, and 1313, respectively, and there may be no defective coupling.

In addition, when the user pulls the face guard 14 with force greater than the magnetic force in the state in which the three magnetic bodies 1451, 1452, and 1453 are attached by the magnetic force, the face guard 14 can be easily separated from the rear body 13.

A spacing protrusion 147 protruding from an outer surface of the face guard 14 to maintain the state in which at least a portion of the connection portion 143 is spaced apart from the filter cover 342.

The spacing protrusion 147 can be provided in one or plurality from an outer surface of the connection portion 143. The spacing protrusion 147 can be convex or rounded. The spacing protrusion 147 can be disposed in a region of the filter cover 342.

In addition, the spacing protrusion 147 can be disposed to be elongated in the front and rear direction on the outer surface of the connection portion 143. The spacing protrusion 147 can be provided to have lengths (e.g., L1, L2, L3) corresponding to widths (front and rear direction) of the connection portion 143 in which the spacing protrusion 147 is disposed.

The spacing protrusion 147 can be provided in plurality to be spaced apart from each other. A plurality of spacing protrusions 147 can be disposed at left and right surfaces of the connection portion 143, respectively. The plurality of spacing protrusions 147 can be symmetrically disposed on the basis of a vertical line passing through a center of the face guard 14.

In detail, the spacing protrusion 147 can include a first protrusion 1471 disposed at a lower point of the left surface of the connection portion 143, a second protrusion 1472 disposed at an upper side of the first protrusion 1471, and a third protrusion 1473 disposed above the second protrusion 1472.

The first to third protrusions 1471 to 1473 can be disposed to be spaced apart from each other in the vertical direction. The first to third protrusions 1471 to 1473 can be disposed in parallel to each other.

In addition, the first to third protrusions 1471 to 1473 can extend to be elongated in the front and rear direction on the side surface of the connection portion 143. Here, the first to third protrusions 1471 to 1473 can be provided to have a length corresponding to a length of a width (front and rear direction) of the connection portion 143.

As illustrated in FIG. 12, the connection portion 143 can be provided in a shape of which the width in the front and rear direction increases upward from the lower portion, and thus, the third protrusion 1473 disposed above the connection portion 143 can be provided to be longer than the first protrusion 1471 disposed under the connection portion 143.

In some examples, the first to third protrusions 1471 to 1473 can be disposed in a region of the filter cover 342. This is to prevent a portion of the face guard 14 from covering the suction hole, that is, the suction grille 343 while the face guard 14 is pressed when the user wears the mask apparatus 10.

That is, even when the face guard 14 is pressed by external force, the first to third protrusions 1471 to 1473 can be maintained in the state in which the face guard 14 is spaced apart from the filter cover 342.

In some implementations, the first protrusion 1471 can be disposed at a point corresponding to a lower end of the filter cover 342, the second protrusion 1472 can be disposed at a point corresponding to a central portion of the filter cover 342, and the third protrusion 1473 can be disposed at a point corresponding to an upper end of the filter cover 342.

Through-holes 1481 and 1482 for ventilation can be defined in a portion the face guard 14, which is in close contact with the user's face. A plurality of the through-holes 1481 and 1482 can be defined along an edge of the close contact portion 142. Each of the through-holes 1481 and 1482 can have a circular or non-circular cross-section.

When the user wears the mask apparatus 10, the close contact portion 142 of the face guard 14 is fixed to be in close contact with the user's face. In this case, when the mask apparatus 10 is worn for a long time, sweat or contaminants can be accumulated on the user's face. Therefore, the plurality of through-holes 1481 and 1482 can be defined in the close contact portion 142 of the face guard 14 to ventilate the user's face.

The mask apparatus including the above-described constitutions can have following effects.

In some implementations, since both the suction hole and the discharge hole of the mask apparatus are disposed on the rear surface of the mask body covering the user's face, the flow resistance can be significantly reduced when compared to the case in which the suction hole of the mask apparatus is defined in the front surface of the mask body or other portions except for the mask body.

In some implementations, where the suction hole is not exposed to the outside while the user wears the mask apparatus, a separate cover member may not be provided to cover the suction hole. Furthermore, since a separate cover member is not provided to be mounted on the front surface of the mask apparatus, there can be the effect that the cover member is not damaged or separated by the external force.

In some implementations, since the suction hole is defined in the rear surface of the mask body, if the mask apparatus is taken off so that the front surface of the mask body is faced forward or upward, the phenomenon in which the dust or other foreign substances are introduced into the mask apparatus through the suction hole can be minimized.

In some implementations, while the user wears the mask apparatus, even if the face guard is pressed, a portion of the face guard may not cover the suction hole of the mask apparatus by the spacing protrusion. Therefore, there can be an advantage in that the suction hole is prevented from being blocked to cause uncomfortable in breathing.

In some implementations, since the plurality of spacing protrusions are respectively disposed in the front and rear direction on the side surface of the face guard, the face guard can be prevented from being excessively pressed by the external force to improve the wearing sensation.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mask apparatus comprising:

a mask body that defines a suction hole configured to receive external air from an outside of the mask apparatus and a discharge hole configured to discharge air to the outside, the mask body comprising a rear body and a front body that is coupled to a front surface of the rear body;

a face guard coupled to a rear surface of the rear body and configured to be in contact with a face of a user, the face guard defining a breathing space; and an air cleaning module disposed at the rear body and configured to filter the external air received through the suction hole and to supply the filtered air into the breathing space, the air cleaning module comprising a fan disposed at the suction hole and a filter housing configured to accommodate a filter, wherein the filter and the suction hole are positioned between the fan and the face guard, wherein the suction hole is defined outside the breathing space, wherein the discharge hole is defined inside the breathing space, and wherein the face guard comprises:

a coupling portion that faces the rear surface of the rear body, a close contact portion configured to be in contact with the face of the user, a connection portion that connects the coupling portion to the close contact portion, the connection portion defining one or more widths of the face guard in a front-rear direction, and a spacing protrusion that protrudes from an outer surface of the connection portion to thereby separate at least a portion of the connection portion from the suction hole, wherein the rear body defines the suction hole, and the suction hole is formed on the rear surface, the front body covering a front side of the suction hole, and wherein both the rear surface and the suction hole are configured to face the spacing protrusion of the face guard.

2. The mask apparatus according to claim 1, wherein the spacing protrusion has a convex shape or a rounded shape.

3. The mask apparatus according to claim 1, wherein the spacing protrusion extends along the outer surface of the connection portion in the front-rear direction.

4. The mask apparatus according to claim 3, wherein a length of the spacing protrusion in the front-rear direction is equal to one of the one or more widths of the connection portion.

5. The mask apparatus according to claim 1, wherein the spacing protrusion is one of a plurality of spacing protrusions that are spaced apart from one another.

6. The mask apparatus according to claim 5, wherein the plurality of spacing protrusions extend in parallel to one another.

7. The mask apparatus according to claim 5, wherein the plurality of spacing protrusions are spaced apart from one another in a vertical direction crossing the front-rear direction.

8. The mask apparatus according to claim 5, wherein the plurality of spacing protrusions comprise:

a first protrusion disposed at a lower part of the connection portion, the first protrusion having a first length in the front-rear direction; and a second protrusion disposed above the first protrusion, the second protrusion having a second length in the front-rear direction greater than the first length.

9. The mask apparatus according to claim 8, wherein the plurality of spacing protrusions further comprise:

a third protrusion disposed above the second protrusion, the third protrusion having a third length in the front-rear direction greater than the second length.

10. The mask apparatus according to claim 1, wherein the filter housing is disposed at the rear body and is in fluid communication with the suction hole, the filter housing being configured to accommodate the filter disposed at the suction hole.

11. The mask apparatus according to claim 10, wherein the filter housing comprises:

a filter frame configured to surround a side surface of the filter; and a filter cover disposed at a rear surface of the filter frame, the filter cover defining a suction grille that is in fluid communication with the suction hole.

12. The mask apparatus according to claim 11, wherein the spacing protrusion is disposed at a position corresponding to the filter cover.

13. The mask apparatus according to claim 12, wherein the spacing protrusion is one of a plurality of spacing protrusions that are spaced apart from one another in a vertical direction crossing the front-rear direction, and wherein the plurality of spacing protrusions comprise:

a first protrusion facing a lower end of the filter cover; and a second protrusion that is disposed above the first protrusion in the vertical direction and faces a middle portion of the filter cover disposed above the lower end of the filter cover.

14. The mask apparatus according to claim 13, wherein the first protrusion has a first length in the front-rear direction, and wherein the second protrusion has a second length in the front-rear direction greater than the first length.

15. The mask apparatus according to claim 14, wherein the plurality of spacing protrusions further comprise a third protrusion that is disposed above the second protrusion in the vertical direction and faces an upper end of the filter cover, the third protrusion having a third length in the front-rear direction greater than the second length.

16. The mask apparatus according to claim 1, wherein the suction hole is defined outside the breathing space, and the discharge hole is defined inside the breathing space.

17. The mask apparatus according to claim 16, wherein the suction hole is one of a plurality of suction holes comprising:

a left suction hole defined at a left side of the face guard; and a right suction hole defined at a right side of the face guard, and wherein the spacing protrusion is one of a plurality of spacing protrusions comprising:

a left protrusion that protrudes from a left surface of the connection portion at the left side of the face guard, and a right protrusion that protrudes from a right surface of the connection portion at the right side of the face guard.

18. The mask apparatus according to claim 1, wherein the face guard separates the discharge hole from the suction hole.

19. The mask apparatus according to claim 18, wherein the outer surface of the connection portion faces and is exposed to the air cleaning module, and wherein an inner surface of the connection portion is defined at an opposite side of the outer surface of the connection portion and faces the breathing space.

* * * * *